Jan. 21, 1958
W. S. LEVIN
2,820,902
GATED FREQUENCY DOUBLER
Filed Feb. 4, 1955
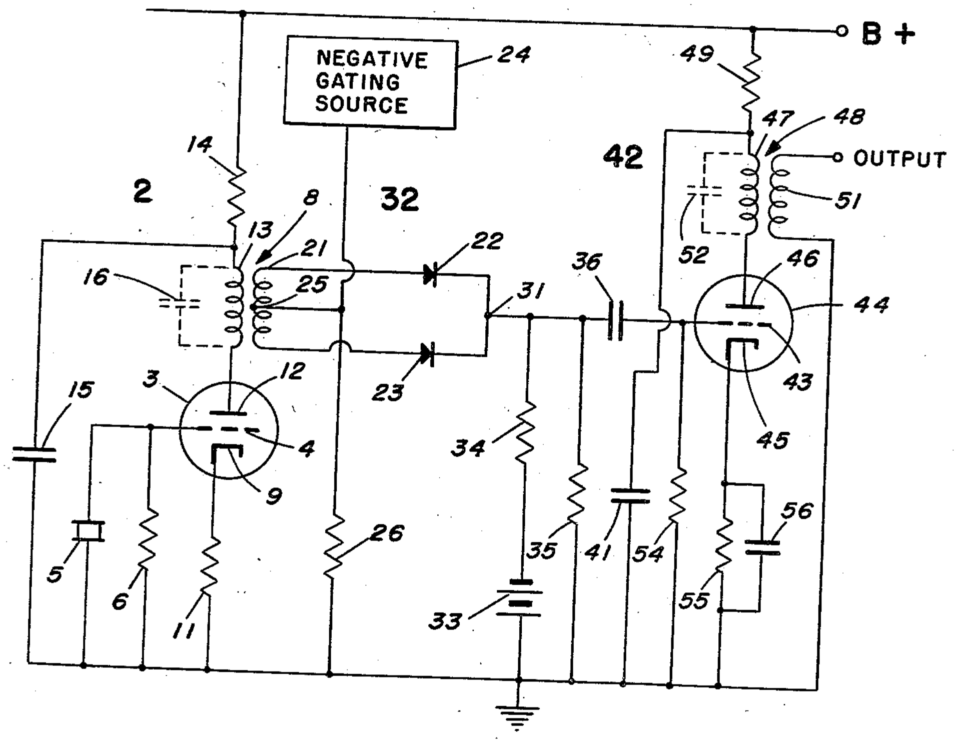
INVENTOR
WILLIAM S. LEVIN
BY [signature]
[signature]
ATTORNEYS

United States Patent Office 2,820,902

Patented Jan. 21, 1958

2,820,902

GATED FREQUENCY DOUBLER

William S. Levin, Baltimore, Md., assignor, by mesne assignments, to the United States of America as represented by the Secretary of the Navy Application February 4, 1955, Serial No. 486,295

8 Claims. (Cl. 250—36)

The present invention relates to a gated frequency doubler and more particularly to a gated frequency doubler having a non-leak gating circuit.

In the past the circuitry for obtaining a high frequency pulsed signal has involved the use of one tube for an oscillator and a second tube for pentode mixing in order to obtain the gating action. This circuitry has the disadvantages of the possibility of a burned out filament in either of two tubes; the power consumption and cost of two tubes; and also the space problem with two tubes.

The present invention is a system for obtaining a gating action of an oscillator using a single tube and also for having the gating circuit cooperate with a tuned amplifier circuit to give a frequency doubled output. Since all of these circuits require an amplifier circuit, no additional tubes have been added. The pentode along with its attendant disadvantages of filament failure, power and space consumption and cost have been eliminated. In addition the frequency doubled output means that higher frequencies are attainable with the same elements, or that the same frequencies are attainable with cheaper and more stable elements.

An object of the present invention is to provide a circuit for producing a gated signal using a minimum of circuit elements.

Another object is the provision of a circuit for producing a frequency doubled gated signal using a minimum number of tubes.

Still another object of the present invention is the provision of a circuit for producing a frequency doubled gated signal in which a high degree of gating is obtained with the use of a minimum number of tubes.

Other objects and many of the attendant advantages of this invention will be readily appreciated as the same becomes better understood by reference to the following detailed description when considered in connection with the accompanying drawings wherein:

The figure shows a schematic presentation of the circuit.

Referring now to the drawings, wherein like reference characters designate like or corresponding parts, there is shown in the figure a tuned-plate, tuned-grid crystal oscillator 2 but which could be of a different type such as a Hartley or a Colpitts type. In this oscillator the tube 3 has a grid 4 connected to a crystal 5 and a grid leak resistor 6. The cathode 9 is connected through a degenerative cathode resistor 11 to ground. The plate 12 is coupled through a transformer primary 13 of a transformer 8 through voltage dropping and filter resistor 14 to the B+ supply. A decoupling capacitor 15 is provided for a filtering action. The distributed capacity of the transformer primary 13 is shown at 16. In the gating circuit 32 two rectifiers 22 and 23 are connected in full-wave relationship to the secondary 21. These rectifiers are preferably but not necessarily of the non-electron tube type such as germanium crystals. A negative gating source 24 is connected to a center tap 25 of the secondary 21. The center tap 25 is connected through a resistor 26 to ground. A voltage bias supply 33 is connected through resistor 34 to the junction 31 of the rectifiers. The resistor 35 completes the circuit of the bias supply 33. The junction 31 is connected through coupling capacitor 36 to the grid 43 of tube 44 in the tuned amplifier circuit 42. A grid-return resistor 54 is provided for grid 43. The cathode 45 of tube 44 is connected through a self-bias circuit consisting of resistor 55 and capacitor 56 to ground. The plate 46 is connected to the primary 47 of transformer 48 and through resistor 49 to the B+ supply. A decoupling capacitor 41 is connected to resistor 49. The distributed capacitance of the primary 47 is shown at 52. The output of the circuit is the signal across secondary 51 of transformer 48.

The output of oscillator 2 appears across secondary 21. The bias on the rectifiers is sufficent to maintain the rectifiers 22 and 23 non-conducting in the absence of a negative gate signal from 24. The amplitude of the gate is less than the bias so that the negative swing of the output of oscillator 2 carries the rectifiers into conduction, thus avoiding a step function on the grid 43 of amplifier 42. The rectifiers 22 and 23 of the gating circuit 32 produce a full wave rectified output across resistor 35. The fundamental frequency of this rectified output is double the frequency output of oscillator 2. Amplifier 42 is tuned by means of the inductance and distributed capacitance 52 to this double frequency, thus the output across secondary 51 is a gated double frequency output. There are several ancillary features in this circuit. Cathode resistor 11 of the oscillator provides negative feedback to keep coupled energy between the two triodes to a minimum. During the interval between gates, the oscillator output currents flowing through the shunt capacities of the rectifiers are equal and opposite in resistor 35 and so cancel. This cancellation offers a high degree of gating, especially for low power applications. At high frequencies the distributed capacitors 16 and 52 should be large enough for tuning but at lower frequencies it may be necessary to supplement these distributed capacitors with parallel connected lumped capacitors. This system can be used at many frequencies through suitable selection of the circuit components. The following components are suitable for a ½ ms., 30 mc. output although these are cited merely by way of example and are in no way to be construed as limiting the scope of the invention:

| | |
|---|---|
| B+ supply | 250 volts. |
| Bias 33 | —150 volts. |
| Resistor 11 | 15K ohms. |
| Resistor 6 | 200K ohms. |
| Resistor 26 | 1K ohms. |
| Resistor 34 | 100K ohms. |
| Resistor 35 | 20K ohms. |
| Resistor 54 | 100K ohms. |
| Resistor 55 | 510 ohms. |
| Capacitor 56 | 510 $\mu\mu$ farads. |

A 15 mc. crystal and 15 mc. transformer primary could be used in the oscillator circuit and a 30 mc. transformer primary employed in the amplifier. The tube type is not a critical item and a 6BK7 duo-triode with internal shield between triode sections has been found workable, or a 12AT7 for a gating ratio of 15:1 or better.

A frequency-doubling gated circuit has been disclosed involving a minimum number of tubes in the oscillator and gating circuits, viz. one, and having a gating circuit so designed that any currents leaking through the rectifier capacitances are cancelled. Thus, a small, inexpensive, low power consuming system has been obtained.

Obviously many modifications and variations of the present invention are possible in the light of the above teachings. It is therefore to be understood that within the scope of the appended claims the invention may be practiced otherwise than as specifically described.

What is claimed is:

1. A system for producing a gated frequency doubled output comprising an oscillator for producing an output of a first frequency, an amplifier tuned to a second frequency which is double that of said first frequency and having input circuit means and output circuit means, and means coupled to said oscillator and connected to said amplifier input circuit means for gating and fullwave rectifying the oscillator output whereby a gated frequency doubled signal is produced at said amplifier output circuit means.

2. A system for producing relatively low frequency pulsations of a relatively high frequency signal comprising an oscillator for producing an output at half said high frequency, gate means upon energization for full wave rectifying the oscillator output, bias means for normally maintaining said gate means in a non-energized state, gate pulse means for producing pulsations at said relatively low frequency, means connecting said gate pulse means to said gate means whereby upon the occurrence of pulsations from said gate pulse means said gate means is energized, and circuit means connected to said gate means tuned to said high frequency and having an output wherein relatively low frequency pulsations of said relatively high frequency are produced.

3. A system for producing a high frequency gated signal comprising a crystal oscillator for producing an output at half said high frequency, two rectifiers connected in full wave relationship for full wave rectifying the oscillator output, bias means connected to the junction of said two rectifiers for producing a voltage to normally maintain said rectifiers in a non-conducting state, gate source means connected to said rectifiers, said gate source means providing a gate pulse of magnitude slightly less than the voltage of said bias means whereby said rectifiers are on the verge of conduction upon a gate pulse, an amplifier tuned to said high frequency and having an input connected to said junction whereby a high frequency gated signal is produced on the output of said amplifier.

4. A gating circuit comprising two rectifiers with a similar electrode of each connected together at a junction, an impedance having a center tap connected between the other similar rectifier electrodes, direct voltage bias means connected to said junction, and a gating source of pulses of the same polarity but of slightly less magnitude than the direct voltage bias connected to said center tap.

5. A system for producing a gated signal of a high frequency wave comprising in combination a tuned-plate tuned-grid oscillator for producing a signal at half said high frequency, a transformer primary in the plate circuit of said oscillator the reactance of which is a part of the tuned-plated resonance circuit, a transformer secondary inductively coupled to said transformer primary, two ends and a center tap on said transformer secondary, two similar rectifiers each having a pair of electrodes with a similar electrode of each connected together at a junction, the other similar electrodes being connected respectively to the ends of said transformer secondary, means producing a direct current bias connected to said junction, means for producing a gate signal having a voltage of the same polarity but of slightly less magnitude than the direct current bias connected to said center tap, and an amplifier tuned to said high frequency having an input and an output with the input connected to said junction whereby a gated signal of said high frequency is produced in the amplifier output.

6. A system for producing a modulated wave of a carrier frequency comprising in combination first means for producing an output at half the carrier frequency, second means for producing a modulation signal, a full-wave rectifier connected to said first means for producing a full-wave rectified signal of said output, means for normally biasing said rectifier in a non-conducting condition, connections between said second means and said rectifier whereby upon occurrence of a modulation signal and an output of said first means said rectifier is in a conducting state, and a means for converting said full-wave rectified signal into a sine wave at said carrier frequency having an envelope of said modulation signal.

7. A gated frequency doubling system comprising: means for producing an alternating current signal of a first frequency, a full-wave rectifier circuit connected to produce a pulsating direct current signal from said alternating current signal, bias means connected to block conduction of said full-wave rectifier circuit, gating means for biasing said rectifier circuit for controllable intervals in a manner such that each rectifier of said rectifier circuit will conduct only when the alternating current signal applied to the rectifier is of a magnitude greater than zero, and an amplifier circuit tuned to double the first frequency and connected to be energized by the direct current signal.

8. A gated frequency doubling system comprising: means for producing an output alternating current signal of a first frequency, a tunable amplifier circuit tuned to double the first frequency, full-wave rectifying means coupled to said alternating current signal producing means for producing a pulsating direct current signal from the alternating current signal, means coupling the direct current signal to said amplifier circuit, and gate means coupled to said rectifying means for controlling the conduction time of said rectifying means.

References Cited in the file of this patent

UNITED STATES PATENTS

| | | |
|---|---|---|
| 2,364,756 | Roberts | Dec. 12, 1944 |
| 2,443,195 | Pensyl | June 15, 1948 |
| 2,531,600 | Barney et al. | Nov. 28, 1950 |

OTHER REFERENCES

"The General Radio Experimenter," vol. 26, No. 2, for July 1951.